March 9, 1954
R. S. HINSEY
2,671,353
MECHANISM CONTROL
Filed July 1, 1948
2 Sheets-Sheet 1
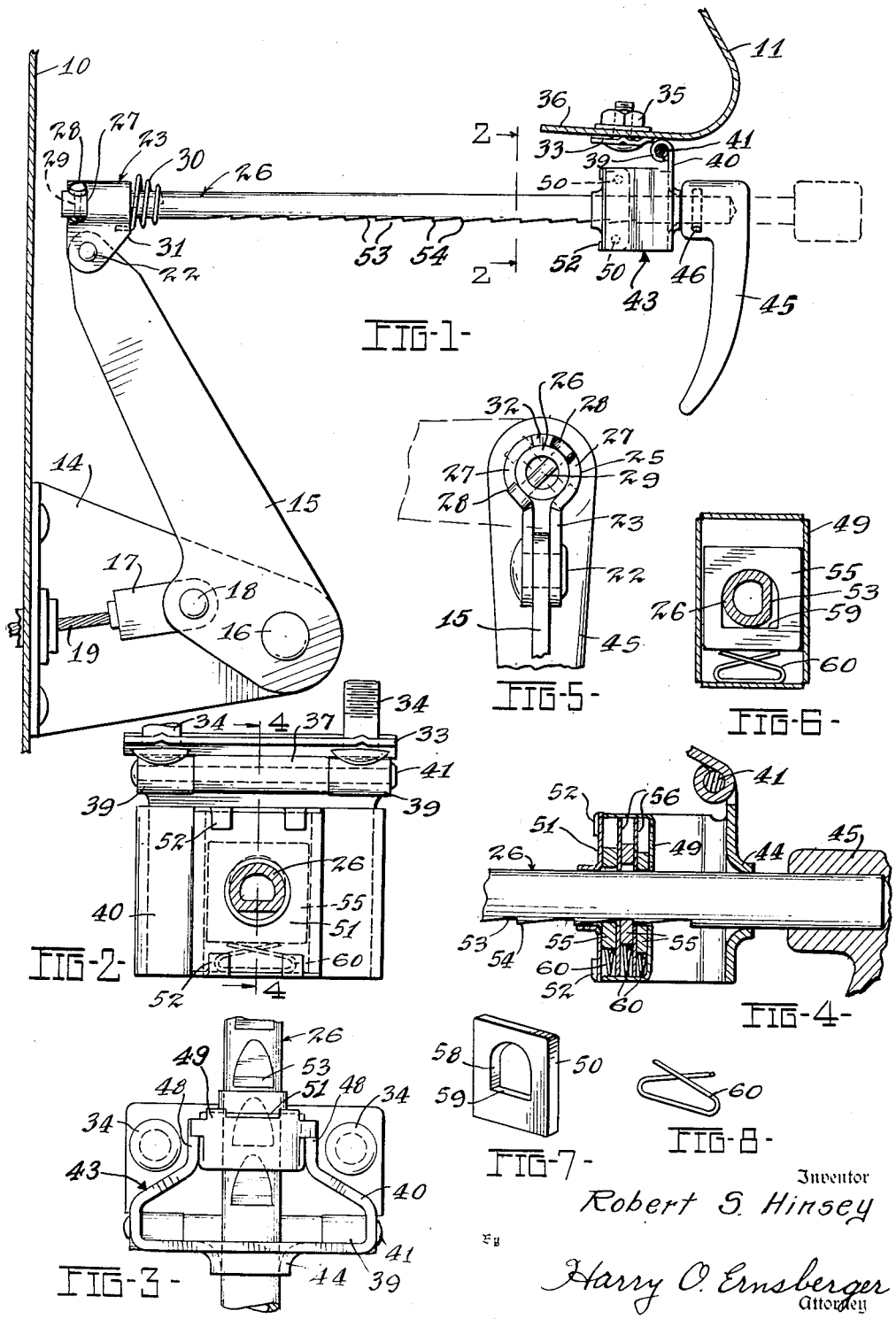
Inventor
Robert S. Hinsey
Harry O. Ernsberger
Attorney March 9, 1954 R. S. HINSEY 2,671,353
MECHANISM CONTROL
Filed July 1, 1948 2 Sheets-Sheet 2
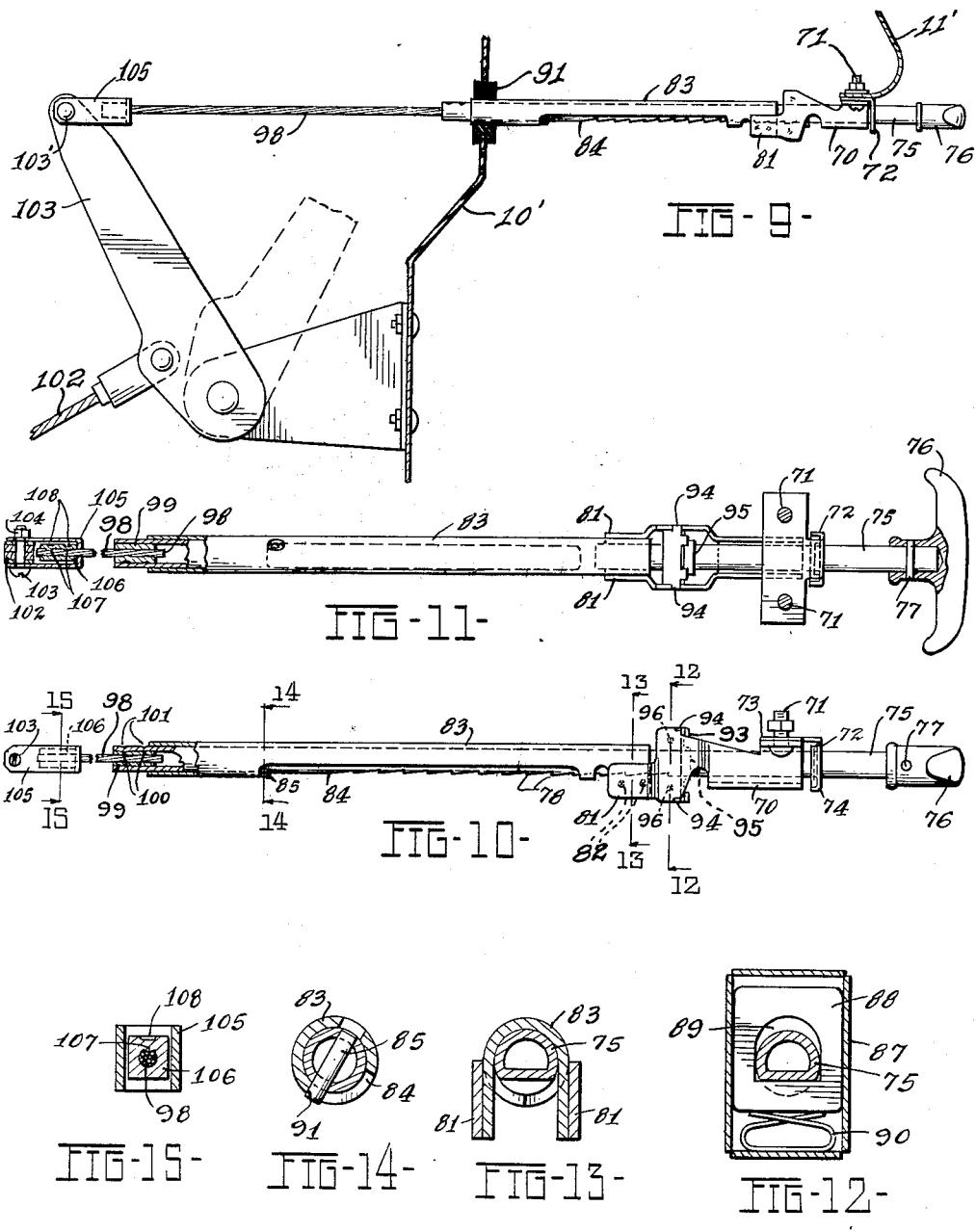
INVENTOR.
Robert S. Hinsey
BY
Harry O. Ernsberger
ATTY.

Patented Mar. 9, 1954

2,671,353

UNITED STATES PATENT OFFICE 2,671,353

MECHANISM CONTROL

Robert S. Hinsey, Toledo, Ohio, assignor to The Bingham-Herbrand Corporation, Toledo, Ohio, a corporation of Ohio Application July 1, 1948, Serial No. 36,549

5 Claims. (Cl. 74—503)

This invention relates to mechanism actuating or controlling devices and more especially to an arrangement particularly adapted for actuating or controlling brake mechanism of a vehicle.

The invention is inclusive of an actuating or control means for mechanism provided with a manipulating member adapted for movement in a longitudinal direction in combination with means for positively retaining the mechanism actuating member in adjusted position.

The invention includes the provision of a mechanism control device having a manipulating member arranged for longitudinal movement which is arranged for movement in another direction to effect a release of a locking means normally arranged to retain the member in a longitudinally adjusted position.

The invention embraces the provision of an arrangement for actuating or controlling brake mechanism of a vehicle in which a member is movable longitudinally to actuate the brake mechanism to "set" position in combination with a retaining means for such member whereby a comparatively minute adjustment of the member may be obtained.

An object of the invention resides in the provision of a plurality of locking pawls of clutches cooperable with a longitudinally-movable mechanism-actuating member whereby the member may be held in an adjusted position, the latter being capable of rotation in order to effect a release of the pawl or clutch members.

Another object of the invention resides in the means for mounting the brake actuating device including a longitudinally movable member without any binding of the mechanism.

Another object of the invention resides in the provision of a pull type brake actuating device for vehicles embodying a longitudinally movable member and cooperating clutch means for retaining the member in adjusted position and whereby rotation of the member with respect to the clutch means effects a release of the member, the member being urged in one direction of rotation by an established initial torque of an element associated with said member.

A further object of the invention resides in a mechanism actuating and controlling device embodying a longitudinally movable actuating member with clutch means for holding the member in adjusted position and embodying means affording limited rotational movement of said member to effect a release of the clutch means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view showing a form of mechanism actuating and controlling device of my invention;

Figure 2 is an enlarged vertical sectional view taken substantially on the line 2—2 of Figure 1;

Figure 3 is a bottom plan view of the construction illustrated in Figure 2;

Figure 4 is a detail sectional view taken substantially on the line 4—4 of Figure 2;

Figure 5 is an end view of a portion of the construction illustrated in Figure 1;

Figure 6 is a detail sectional view illustrating one of the clutch members or pawls and the enclosure therefor;

Figure 7 is an isometric view illustrating one of the pawls;

Figure 8 is an isometric view illustrating a spring for use with a pawl;

Figure 9 is a view similar to Figure 1, illustrating a modified form of the invention;

Figure 10 is a side elevational view, certain parts being shown in section, of the form of the invention shown in Figure 9;

Figure 11 is a top plan view of the arrangement shown in Figure 10;

Figure 12 is a vertical sectional view taken substantially on the line 12—12 of Figure 10;

Figure 13 is a detail sectional view taken substantially on the line 13—13 of Figure 10;

Figure 14 is a sectional view taken substantially on the line 14—14 of Figure 10, and Figure 15 is a detail sectional view taken substantially on the line 15—15 of Figure 10.

While I have illustrated the mechanism actuator or control means of my invention in an arrangement for actuating or manipulating emergency or parking brakes of a vehicle, it is to be understood that I contemplate the utilization of the arrangement of my invention in conjunction with any type of mechanism where the same may be found to have utility.

Referring to the drawings in detail, I have illustrated the embodiments of my invention mounted in a manner to actuate the emergency or parking brakes of a vehicle and numeral 10 indicates a dash board of the vehicle and 11 a lower portion of the instrument panel. As particularly shown in Figure 1, there is secured to the dash board 10 a bracket 14 upon which is pivotally mounted lever 15 upon a shaft or pivot pin 16. A clevis 17 is connected to the lever 15 by means of a pin 18, the clevis being secured to one end of a cable 19 which passes through the dash board 10 and is connected to the brake mechanism of the vehicle (not shown).

In connection with the embodiment of the invention shown in Figure 1, the lever 15 projects upwardly and is connected by means of a pin or rivet 22 with a U-shaped fitting or bracket 23. The bracket 23 is provided with a cylindrical configuration 25 adapted to embrace the end portion of a member or bar 26. The forward edge portion of bracket 23 is formed with diametrically arranged recesses 27 adapted to accommodate the head portions 28 of a pin or rivet 29 which extends transversely through aligned openings in the walls of the tube 26. The projecting wall portion 32 disposed between the recesses 27 forms abutment or limiting means for determining the extent of relative rotary movement of the tube or bar 26 with respect to the bracket 23. Resilient means, for example, a coil spring 30, having one end connected to the bracket 23 as at 31 and the other end connected to the member 26 serves to urge the bar 26 in one direction of rotation to maintain one of the heads 28 of rivet 29 in engagement with the abutment 32 in the manner shown in Figure 5. Means are provided for supporting the bar 26 including a member or plate 33 formed with openings to receive securing bolts 34 and nuts 35 whereby the member 33 is secured to a forwardly extending flange 36 of the vehicle instrument panel 11. The member 33 is formed with a central portion 37 of cylindrical configuration which is aligned with spaced cylindrical portions 39 formed on a member 40, the portions 37 and 39 being connected together by means of a hinge pin 41. Through this method of mounting, member 40 is arranged for pivotal movement about the axis of pin 41 and relative to the member 33. The member 40 forming part of the hinge construction is integrally formed with an extending portion 43 with which is associated a clutch or pawl mechanism for retaining the manipulating bar or tube 26 in adjusted portion. The member 40 is formed with an annular flange portion 44 forming a guide through which projects the bar 26. The outer extremity of the bar 26 is provided with a handle or hand grip 45 which is bored to accommodate the bar 26, a pin 46 serving to secure the handle 45 to the bar 26.

The member 40 is formed with spaced parallel wall portions 48 which form the means for positioning and supporting a housing or enclosure 49 within which is disposed the clutch or pawl means for retaining the tube 26 in adjusted position. The walls 48 are preferably spot welded to the housing 49 as indicated at 50. The housing 49 is of rectangular configuration and is provided with a closure plate 51 which is secured to housing 49 by means of overlapping ears or portions 52 of the housing 49 which engage the outer edge portions of plate 51. The bar 26 is provided with a plurality of serrations 53 which form teeth 54 for engagement with the clutch or pawl mechanism to hold the bar or tube 26 in adjusted position. Slidably mounted within the housing 49 is a plurality of pawls 55, in the embodiment illustrated there being three pawls which are separated by means of comparatively thin discs or spacers 56. In this form of the invention, the pawls are of rectangular configuration and are arranged for vertical slidable movement within the housing 49, one of the pawls being shown per se in Figure 7. Each of the pawls is formed with a central opening 58 of the particular configuration illustrated in Figures 6 and 7 so as to permit relative rotation of bar 26 extending through the openings 58 in the pawls, the latter having substantially uniplanar or horizontal edge portions 59 which are adapted to cooperate with the recesses 53 in bar 26 to permit the pawls to engage teeth 54 in the bar to hold the latter in position. Each pawl 55 is urged in an upward direction under the influence of a hairpin-like spring 60, there being an individual spring for each pawl as shown in Figure 4.

Through the utilization of three pawls, as shown in Figure 4, a comparatively fine adjustment of bar 26 may be attained as one of the three pawls 55 is in position to engage a tooth 54 in the bar 26. Thus cooperative engagement of the pawls 55 with the teeth 54 in the tube or rod 26 serves to restrain movement of the bar 26 in a left hand direction as viewed in Figure 1 until release is effected in a manner hereinafter explained.

The operation of this form of my invention is as follows: The mechanism actuating means of my invention as illustrated in Figure 1 is in brake-release position. When it is desired to effect a setting of the vehicle brakes the operator grasps the handle or grip portion 45 and exerts a longitudinal pull upon the bar or tube 26 withdrawing the tube through the housing 49 and member 43 during which action the pawls 55 override the teeth 54 formed on tube 26. When the lever 15 and cable 19 have been moved to a position to set the brakes, one of the pawls or clutch members 55 is in a position to engage a tooth 54 on the tube 26 to prevent return movement of the bar, thus retaining the actuating mechanism in adjusted or "brake set" position. When it is desired to release the brakes, the operator rotates the bar 26 through the medium of the handle 45 by turning the latter in a counterclockwise direction as viewed in Figure 6 so that the teeth 54 are moved out of the zone of the edge walls 59 of the pawls 55 to the position shown in Figure 6. In this position the cylindrical or smooth portion of the tube 56 is then in engagement with the uniplanar edge walls 59 of the pawls so that the bar may be moved longitudinally in a reverse direction, viz. a left hand direction as viewed in Figure 1 to swing the lever 15 about its support 16 in a direction to release the brake mechanism. As soon as the operator disengages his hand from the handle 45 the spring 30, exerting a torsional pressure or rotative stress upon bar 26, automatically rotates the bar in a clockwise direction as viewed in Figure 6 to bring the teeth 54 into the zone of the edge portions 59 of the pawls 55. The head of rivet 28 on the pin 29 engages the abutment 32 to position the shaft so that during succeeding longitudinal movements of the bar 26 toward brake-setting position, the teeth 54 thereon will be in cooperative relation with the pawls 55.

The embodiment of my invention shown in Figures 9 through 15 inclusive is mounted in a manner to be supported by the instrument panel 11' and having an element extending through the dash board 10'. The arrangement of this form of the invention includes a mounting bracket 70 which is secured to the instrument panel by means of bolts 71. An escutcheon 72 is provided having a portion 73 lying between the bracket 70 and the instrument panel and is also held in position by means of the bolts 71. The escutcheon 72 has a depending portion 74 which surrounds the manipulating or pull bar 75 and serves as a guide for the latter. The pull bar 75 is provided with a T-shaped handle 76 which is secured to the bar by means of a pin 77. The bar 75 is provided with serrations forming spaced teeth 78 for cooperation with a clutch or pawl mechanism of the character shown in Figure 4.

The bracket 70 is formed with forwardly projecting wall portions 81 which are welded as at 82 or otherwise secured to a tubular member 83 which surrounds the bar 75, the latter being longitudinally slidable in the member 83. The forward portion of the member 83 extends through a grommet 91 carried in an opening in the dash board 13'. A portion of the wall of the member 83 is cut away as shown in Figure 10 forming a longitudinally extending slot 84 to accommodate the movement of an abutment or pin 85.

The bracket 70 supports a housing 87 within which is disposed clutch means in the form of three locking pawls 88 of the character shown in Figure 4, and which are configurated with central openings 89 of the shape shown in Figure 12. The pawls being urged in a direction into engagement with bar 75 under the influence of hairpin springs 90 which are of the same configuration as springs 60. The pawls 88 are preferably slightly spaced apart by means of comparatively thin discs or plates as in the construction shown in Figure 4. The housing 87 is closed by a plate 93 integrally formed with an annular flange 95 through which the bar 75 is arranged for slidable movement. The pawls 88 cooperate with the teeth 78 on the bar 75 to retain the latter in adjusted position. The housing 87 has projecting ear portions 94 which extend into recesses in bracket 70 as shown in Figure 10. The housing 87 is further secured to the bracket 70 by means of spot welding indicated at 96.

The bar 75 is arranged to be connected to the mechanism to be actuated by means of a flexible cable or member 98 which is provided at one end with a fitting 99, the latter being telescoped into the end portion of tube 75 as shown in Figures 10 and 11. The fitting 99 is held in place upon the cable 98 and in the tube 75 by means of struck-up projections 100 which are formed by a suitable tool striking the exterior surface of the tube 75 at zones 101 which forces the metal of the tube inwardly to form projections 100 and drive the latter forcibly into the wall of the fitting 99 to cause the latter to securely grip the cable 98.

In the embodiment illustrated, the mechanism actuator of my invention is arranged to operate the brakes of a vehicle which are connected by a cable 102 to a lever or member 103. The other end of the flexible cable 98 is connected to a clevis 105 through the medium of an abutment or sleeve 106 of rectangular configuration as shown in Figure 16. The sleeve or abutment 106 is secured to the extremity of the cable by means of projections 107 formed by depressing zones 108 of the fitting in the same manner that the projections 100 are formed in the fitting 99. The clevis 105 is provided with openings to receive a pin 103' which extends through an opening in the lever 103 and is secured in place by a cotter key 104.

In order to resiliently and normally maintain the teeth 78 of the bar or tube 75 in position for cooperation with the latching pawls 88 to hold the bar in adjusted position, the cable 98 is arranged to provide a rotative force acting to maintain the bar normally in such position. To accomplish this result, the cable 98 and clevis 105 together with the fitting or abutment 106 are rotated or twisted about the axis of the cable so that after the clevis is assembled with lever 108 and the pin 103' inserted in position, an inherent torque or rotative stress is thus imparted to the cable which will exert a corresponding rotative torque upon the bar 75 so as to maintain the pin 85 in engagement with the edge wall 91 of the slot 84 as shown in Figures 10 and 14. In this position the teeth 78 are aligned with the interior uniplanar edge portions of the pawls 88 which are in position to cooperate with the teeth and hold the bar in adjusted or brake-set position.

When it is desired to set the brakes, the vehicle operator grasps the handle member 76 and withdraws the bar or tube 75 along its longitudinal axis, which movement actuates the lever 103 through the medium of the cable 98 to effect setting of the brakes. During such movement of the tube 75, the pawls 88 override the teeth 78 until the bar or tube 75 has been adjusted to brake-set position. In this position one of the pawls 88 under the influence of the spring 90 is urged into interlocking or clutching relation with one of the teeth 78 on the bar and serves to prevent a retractive movement of the bar. When the operator desires to release the brakes or to retract the bar 75, the handle 76 is rotated through a sufficient angle to move the teeth 78 out of engagement with the locking edge portions of pawls 8, in the same manner as is done in the form of the invention illustrated in Figures 1 through 8 inclusive, after which the bar may be moved longitudinally or retracted to brake release position. After the bar has been retracted and the operator releases his grip upon the handle 76, the force of torque or twist in the cable 98 is sufficient to rotate the bar about its longitudinal axis to a normal position, that is, with the pin 85 in engagement with the wall 91 of the recess or slot 84 in the tubular member or housing 83, which movement aligns the teeth 78 with the locking edge portions of the pawls 88 so that upon subsequent outward movement of the bar 75 the teeth 78 will be in a position to be engaged by the pawls 88. In this form of the invention the cable element 98 serves a dual function of connecting the bar 84 to the mechanism to be actuated and providing a rotative torque imparted to the bar 84 to resiliently maintain the latter in one relative position of rotation.

It is apparent that, within the scope of the invention, modifications and different arrangements may be made other than is herein disclosed, and the present disclosure is illustrative merely, the invention comprehending all variations thereof.

What I claim is:

1. Mechanism actuating means including a longitudinally movable member; a bracket arranged to support said member; a hollow element associated with said bracket; the wall of said hollow element being formed with a longitudinally extending slot; a plurality of teeth formed in said member; locking means associated with said bracket for retaining said member in adjusted position; said member being relatively rotatable to move the teeth thereof out of effective engagement with the locking means; means connected to said member and the mechanism to be actuated including a flexible cable; said flexible cable being subjected to an initial rotative torque to urge said member to one position of rotation.

2. Mechanism actuating means including a longitudinally movable member; a bracket arranged to support said member; a tubular element secured to said bracket through which said member extends; said tubular element having a longitudinally extending slot formed in the wall thereof; a plurality of teeth formed in said member; a plurality of locking plates carried by said bracket and being arranged for slidable movement for engagement with the teeth in said member; said member being relatively rotatable to move the teeth thereof out of engagement with the locking plates for effecting release of said member; a flexible cable connected to said member; said flexible cable being subjected to an initial rotative torque to urge said member to one position of rotation.

3. Means for actuating the brake mechanism of a vehicle which includes a rod adapted for relative slidable and rotational movement; a bracket adapted to be connected to a support; said bracket having a tubular extension associated therewith for guiding said rod; said rod having a plurality of teeth formed therein; locking means carried by said bracket including a plurality of relatively movable locking members arranged for cooperation with the teeth in said rod for retaining the latter in adjusted position; said tubular extension having a longitudinally elongated recess; a lever adapted to be actuated; means for establishing a connection between said lever and said rod including a flexible cable; a clevis connecting said cable with the lever to be actuated; said cable being subjected to an initial rotative torque to resiliently maintain said rod in a position wherein the teeth formed thereon are normally engaged by said locking means; a hand grip connected to said rod for manipulating the rod; and abutment means associated with said rod and engageable with the wall of the recess formed in said tubular extension for limiting the relative rotative movements of said rod.

4. A means for actuating brake mechanism of a vehicle including in combination; a longitudinally movable member; a bracket; means for connecting said bracket to a support; a tubular extension associated with said bracket; said member extending through said tubular extension and having a plurality of teeth formed thereon; a plurality of resiliently mounted pawls carried by said bracket and transversely slidable with respect to the axis of said longitudinally extending member and arranged for cooperation with the teeth on said member to hold the latter in adjusted position; said tubular element being formed with a longitudinally extending recess; means including a flexible cable connecting said member with the brake mechanism; said flexible cable being subjected to an initial rotative torque for urging said member in one direction of rotation; and a hand grip secured to said longitudinally movable member for manipulating the latter.

5. Mechanism actuating means including a longitudinally movable member; a support for said member; a serrated surface formed on said movable member; locking means associated with said bracket and cooperable with the serrated surface on said member for retaining the latter in a longitudinally adjusted position; said member being relatively rotatable to disengage the locking means from operative engagement with the serrated surface for releasing said member; a flexible cable connecting said member and the mechanism to be actuated; said flexible cable being subjected to an initial rotative torque to urge said member to one position of relative rotation.

ROBERT S. HINSEY.

References Cited in the file of this patent

UNITED STATES PATENTS

| Number | Name | Date |
|---|---|---|
| 565,696 | Smith | Aug. 11, 1896 |
| 2,201,004 | Chandler | May 14, 1940 |
| 2,238,920 | Studley | Apr. 22, 1941 |
| 2,253,304 | McGall | Aug. 19, 1941 |
| 2,289,137 | Matter | July 7, 1942 |
| 2,304,356 | Heller | Dec. 8, 1942 |
| 2,329,722 | Jandus | Sept. 21, 1943 |
| 2,377,691 | Jandus | June 5, 1945 |
| 2,608,881 | Sandberg | Sept. 2, 1952 |

FOREIGN PATENTS

| Number | Country | Date |
|---|---|---|
| 226,138 | Switzerland | June 16, 1943 |